United States Patent [19]
Alfaro et al.

[11] Patent Number: 5,135,247
[45] Date of Patent: Aug. 4, 1992

[54] REVERSIBLE TRAILER HITCH

[76] Inventors: Daniel V. Alfaro, 3765 S. Alameda, #101, Corpus Christi, Tex. 78411; William H. Mellberg, 5806 Woodhaven, Corpus Christi, Tex. 78412

[21] Appl. No.: 807,707

[22] Filed: Dec. 16, 1991

[51] Int. Cl.⁵ .............................. B60D 1/07
[52] U.S. Cl. .................. 280/415.1; 280/511
[58] Field of Search .............. 280/504, 406.1, 416.1, 280/456.1, 477, 511, 415.1

[56] References Cited

U.S. PATENT DOCUMENTS

| | | | |
|---|---|---|---|
| 2,872,213 | 2/1959 | Hosford | 280/415 |
| 2,911,233 | 11/1959 | Riddle | 280/415 |
| 3,801,134 | 4/1974 | Dees | 280/416.1 |
| 3,922,006 | 11/1975 | Borges | 280/415 |
| 4,248,450 | 2/1981 | McWethy | 280/415 |
| 4,280,713 | 7/1981 | Bruhn | 280/415 |
| 4,456,279 | 6/1984 | Dirck | 280/415 |
| 4,662,647 | 5/1987 | Calvert | 280/490 |
| 4,697,818 | 10/1987 | Moore | 280/415 |
| 4,729,571 | 3/1988 | Tienstra | 280/415 |

Primary Examiner—Charles A. Marmor
Assistant Examiner—Florian Zeender
Attorney, Agent, or Firm—G. Turner Moller

[57] ABSTRACT

A trailer hitch coupling includes a spindle axially and rotatably movable in a coupling base. The spindle carries a plurality of trailer hitch balls and is rotatable in the base to present a selected one of the trailer hitch balls in towing relation to a trailer hitch. The spindle and base provide alignable openings for receiving a pin for fixing the spindle relative to the base. The spindle is axially movable to juxtapose a plurality of interdigitating slots and shoulders to facilitate alignment of the spindle and base to receive the pin.

7 Claims, 1 Drawing Sheet

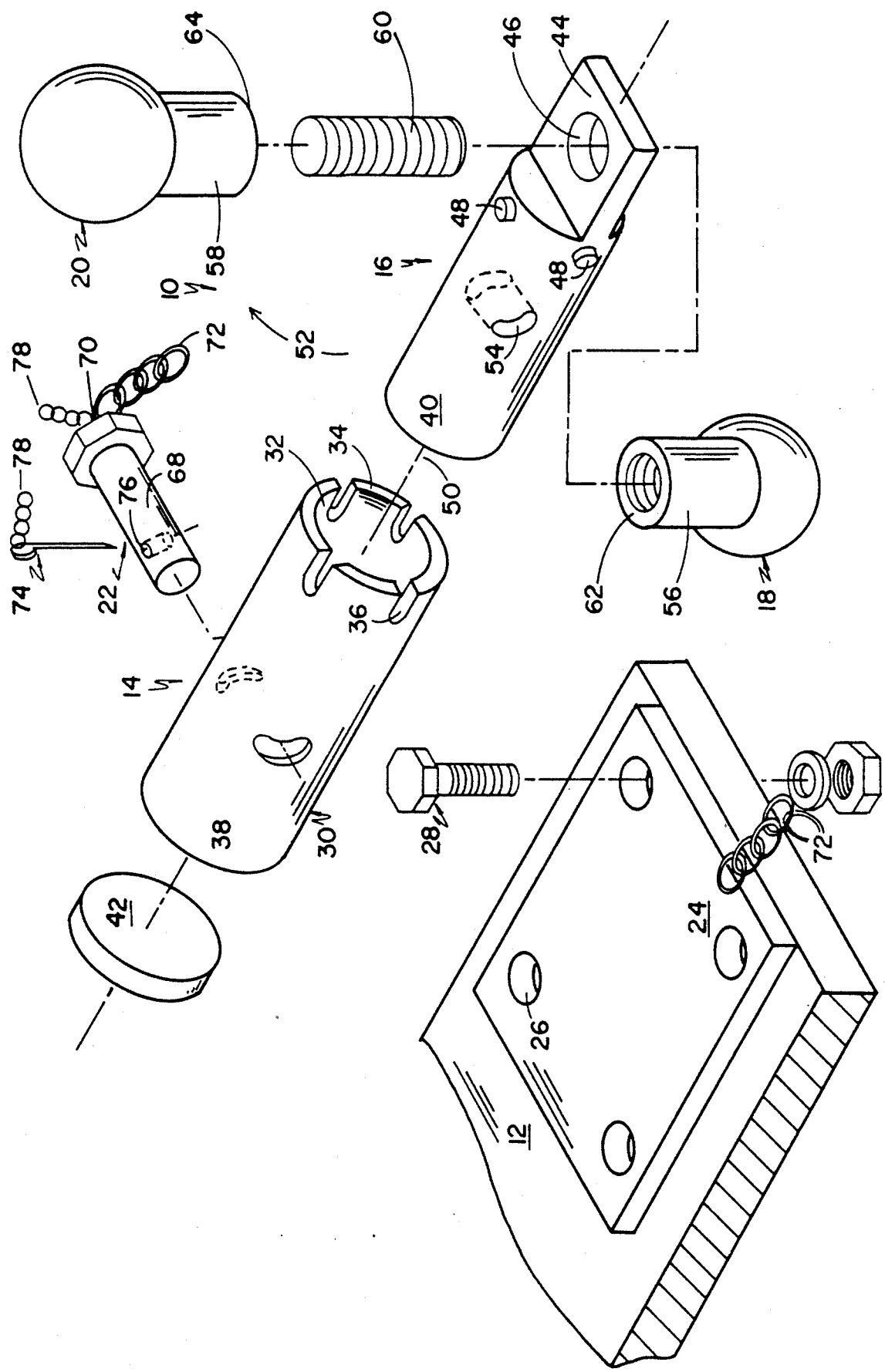

REVERSIBLE TRAILER HITCH

This invention relates to trailer hitches and more particularly to a vehicular towing hitch which can be easily manipulated to provide trailer hitch balls of different size, without requiring tools of any type.

Conventional towing hitches are usually referred to as trailer hitches and are most often of the trailer ball type in which a trailer ball extends upwardly from a mount at the rear of the towing vehicle. Such trailer ball hitches are usually of a single size. Where the user wants to tow trailers having different sized hitch couplings, different sized trailer balls are needed. In conventional situations, the trailer ball on the towing vehicle has to be removed and a different sized trailer ball installed. This is slow and awkward because trailer balls are installed as tightly as possible and are no joy to remove. To many users, current trailer ball connections are inconvenient and irritating.

In response to this situation, the prior art has devised a number of trailer hitches having the capability of more readily changing the trailer hitch ball size, such as found in U.S. Pat. Nos. 2,872,213; 2,911,233; 3,801,134; 3,922,006; 4,248,450; 4,280,713; 4,456,279; 4,662,647; 4,697,818 and 4,729,571. It is this type device to which this invention most nearly relates.

This invention comprises a trailer hitch coupling including a base having means for attachment to a vehicle, a rear end, a front end and a generally cylindrical passage therethrough. A spindle is rotatably movably mounted in the cylindrical passage and axially movably mounted in the cylindrical passage for movement between a first position and a second position. The spindle provides means captivating the spindle in the cylindrical passage including a rear spindle end extending beyond the rear end of the cylindrical passage and providing an enlargement larger than the cylindrical passage and a front spindle end extending beyond the front end of the cylindrical passage and providing an enlargement larger than the cylindrical passage. The front spindle end provides a plurality of trailer hitch balls of different size. Means are provided for cooperating between the base and the spindle for positioning a selected one of the trailer hitch balls in an upstanding towing position including interdigitating means on the base and on the spindle. The interdigitating means includes a plurality of notches and a plurality of abutments interdigitating at the first position of the spindle and preventing rotation of the spindle relative to the base and out of interdigitating relation at the second position of the spindle and allowing rotation of the spindle relative to the base. The base and the spindle provide a pair of aligned passages transverse to the spindle. A pin extends in the aligned passages for retaining the spindle in the first position.

It is an object of this invention to provide an improved trailer hitch having the capacity of presenting one of a plurality of different trailer hitches for towing.

Another object of this invention is to provide a trailer hitch coupling having a rotatable spindle carrying one of a plurality of different trailer balls.

These and other objects of this invention will become more fully apparent as this description proceeds, reference being made to the accompanying drawing and appended claims.

IN THE DRAWINGS

FIG. 1 is an exploded isometric view of a trailer hitch of this invention.

Referring to FIG. 1, a trailer hitch 10 of this invention is attached to a plate 12 of a bumper of a towing vehicle (not shown). The trailer hitch 10 comprises, as major components, a base 14, a spindle 16 having a plurality of trailer balls 18, 20 thereon and means 22 of securing the base 14 and spindle 16 in one of a plurality of rotational positions where either the trailer ball 18 or the trailer ball 20 is vertical and in a towing position.

The trailer hitch base 14 includes a plate 24 having a plurality of openings 26 therein aligned with openings (not shown) in the bumper plate 12 for receiving threaded fasteners 28 or other suitable means for securing the hitch 10 to the towing vehicle. The trailer hitch base 14 also includes a barrel 30 secured to the base plate 24 in any suitable fashion, as by welding or the like. The barrel 30 provides an axial generally cylindrical passage 32 rotatably receiving the spindle 16 therein as will be more fully apparent hereinafter. In the embodiment of FIG. 1, the barrel 30 includes a forward end 34 providing a plurality of axially extending notches or slots 36 and one or more pairs of transverse aligned openings 38 for purposes more fully apparent hereinafter.

The spindle 16 includes an elongate generally cylindrical section 40 extending through and somewhat longer than the barrel 30, providing an enlargement 42 secured to the rear of the cylindrical section 40 in any suitable fashion, as by welding or the like. The forward end of the spindle 16 includes a flat section 44 having a vertical passage 46 therethrough. Adjacent the flat section 44 are a plurality of radial extensions or abutments 48 larger than the passage 32 and sized to pass into the open forwardly facing ends of the notches 36. In the embodiment of FIG. 1, the abutments 48 are cylindrical and are closely received by the slots 36.

The abutments 48 are spaced from the enlargement 42 a distance slightly greater than the length of the barrel 30 so the spindle 16 is mounted for slight axial movement sufficient to allow the abutments 48 to clear the slots 36. The spindle 16 is thereby mounted for axial movement relative to the barrel 30 from a first position in which the abutments 48 interdigitate with the slots 36 and thereby fix the rotational relationship of the spindle 16 and barrel 30 and a second position clear of the slots 36 where the spindle 16 is rotatable relative to the barrel 30 about an axis 50 as suggested by the arrow 52. When the abutments 48 are positioned within the slots 36, two pertinent alignments occur. First, one or the other of the trailer hitch balls 18, 20 is in an upright towing position Second, a transverse passage 54 through the cylindrical spindle section 40 aligns with the pair of openings 38 in the barrel 30.

The trailer hitch balls 18, 20 are preferably of different size or of some different configuration where it is desirable to use one or the other in a towing operation. The balls 18, 20 are connected to the flat section 44 of the spindle 16 in any suitable manner. As shown in FIG. 1, the trailer hitch balls 18, 20 each include an interiorly threaded shank 56, 58 receiving a threaded rod 60. The threaded shanks 56, 58 provide flat faces 62, 64 abutting the flat section 44 of the spindle 16.

The securing means 22 may be of any suitable type and includes a relatively large diameter pin 68 having a head 70 extending through the pair of openings 38 and the transverse passage 54 thereby securing the spindle 16 in a desired rotational position in the barrel 30. The pin 68 is tethered to the base plate 24 in any suitable fashion, as by a chain 72. To captivate the pin 68 in place, a cotter key 74 and passage 76 are provided. The key 74 may conveniently be tethered to the pin head 70 by a small chain 78.

Use of the trailer hitch 10 of this invention should now be apparent. The base plate 24 is secured by the fasteners 28, by welding or the like, to the plate 12 of the towing vehicle. If it is desired to change the trailer ball, the cotter key 74 is removed from the pin 68 and the pin 68 is removed from the passages 38, 54. The spindle 16 is pulled forwardly in the barrel 30 as allowed by the spacing between the abutments 48 and the enlargement 42 so the abutments 48 clear the slots 36. The spindle 16 is then rotated 180° to place the other trailer ball in the upright position. The spindle 16 is moved axially rearward in the barrel 30 so the abutments 48 enter and bottom out in the slots 36. This positions the spindle 16 in the barrel 30 so passages 38, 54 align and the pin 68 can be inserted therethrough without difficulty. After the pin 68 is in place, the cotter key 74 is replaced and the trailer hitch 10 is ready for a towing operation using the previously out-of-use trailer ball.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A trailer hitch coupling comprising
  a base having means for attachment to a vehicle, a rear end, a front end and a generally cylindrical passage therethrough;
  a spindle rotatably movably mounted in the cylindrical passage and axially movably mounted in the cylindrical passage for movement between a first position and a second position and having means captivating the spindle in the cylindrical passage including a rear spindle end extending beyond the rear end of the cylindrical passage and providing an enlargement larger than the cylindrical passage and a front spindle end extending beyond the front end of the cylindrical passage and providing an enlargement larger than the cylindrical passage;
  the front spindle end having thereon a plurality of trailer hitch balls of different size;
  means cooperating between the base and the spindle for positioning a selected one of the trailer hitch balls in an upstanding towing position including interdigitating means on the base and on the spindle, the interdigitating means comprising a plurality of notches and a plurality of abutments interdigitating at the first position of the spindle and preventing rotation of the spindle relative to the base and out of interdigitating relation at the second position of the spindle and allowing rotation of the spindle relative to the base;
  the base and the spindle providing a pair of aligned passages transverse to the spindle; and
  a pin removably received in the aligned passages for retaining the spindle in the first position.

2. The trailer hitch coupling of claim 1 wherein the base comprises a flat plate for connection to the vehicle and a cylindrical member affixed to the plate.

3. The trailer hitch coupling of claim 2 wherein the cylindrical member provides an annular face and the notches open through the annular face.

4. The trailer hitch coupling of claim 3 wherein the notches are evenly spaced and the abutments are evenly spaced.

5. The trailer hitch coupling of claim 4 where the abutments comprise a plurality of spaced shoulders radially extending from the spindle.

6. The trailer hitch coupling of claim 5 wherein the shoulders comprise cylindrical members.

7. The trailer hitch coupling of claim 1 wherein the notches are evenly spaced and the abutments are evenly spaced.

* * * * *